United States Patent [19]
Cohen

[11] 3,961,497
[45] June 8, 1976

[54] UNIVERSAL JOINT

[75] Inventor: William A. Cohen, Brooklyn, N.Y.

[73] Assignee: Sphero International Company, West Long Branch, N.J.

[22] Filed: July 28, 1975

[21] Appl. No.: 599,605

[52] U.S. Cl.......................................... 64/21; 64/18
[51] Int. Cl.² ........................................... F16D 3/30
[58] Field of Search........................ 64/18, 17 R, 21

[56] References Cited
UNITED STATES PATENTS

| | | | |
|---|---|---|---|
| 1,626,270 | 4/1927 | Craun | 64/21 |
| 1,728,949 | 9/1929 | Weiss | 64/21 |
| 2,584,648 | 2/1952 | Welsh | 64/21 |

FOREIGN PATENTS OR APPLICATIONS

| | | | |
|---|---|---|---|
| 198,202 | 5/1936 | France | 64/21 |
| 1,097,613 | 7/1955 | France | 64/21 |

Primary Examiner—Samuel Scott
Assistant Examiner—Randall Heald

[57] ABSTRACT

The joint includes first and second parts, each of which is operatively connected to a different one of two shafts. The parts are relatively movable about a given point in accordance with the angular movement of the shafts relative to each other and are rotatable in accordance with the rotation of the shafts. Each of the parts comprises a pair of radially spaced arcuate fingers which mesh with the corresponding fingers of the other part. One of the fingers on each part is provided with a slot. The slots align radially when the fingers mesh. A pin is provided, extending through the slots to connect the parts for simultaneous rotation and to permit relative movement between the pin and the parts, respectively. The other finger on each part is provided with a gear rack. A beveled idler gear, mounted on the pin, meshes with the gear racks simultaneously and is rotatable as the parts and thus the racks are moved relative to each other. The degree of rotation of the gear is a function of the movement between the parts and causes the pin to move relative to the parts. This movement maintains the pin at a position equally distant from the axes of the shafts. As long as this position is maintained, torque is transmitted from one shaft to another at uniform angular velocity, regardless of the angular position of the shafts relative to each other.

10 Claims, 7 Drawing Figures

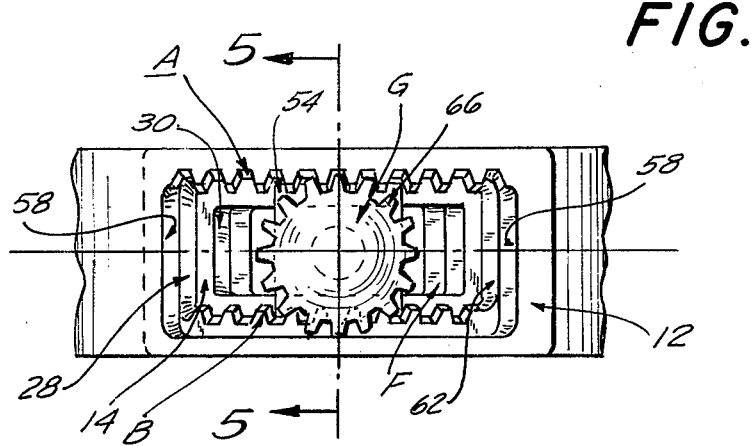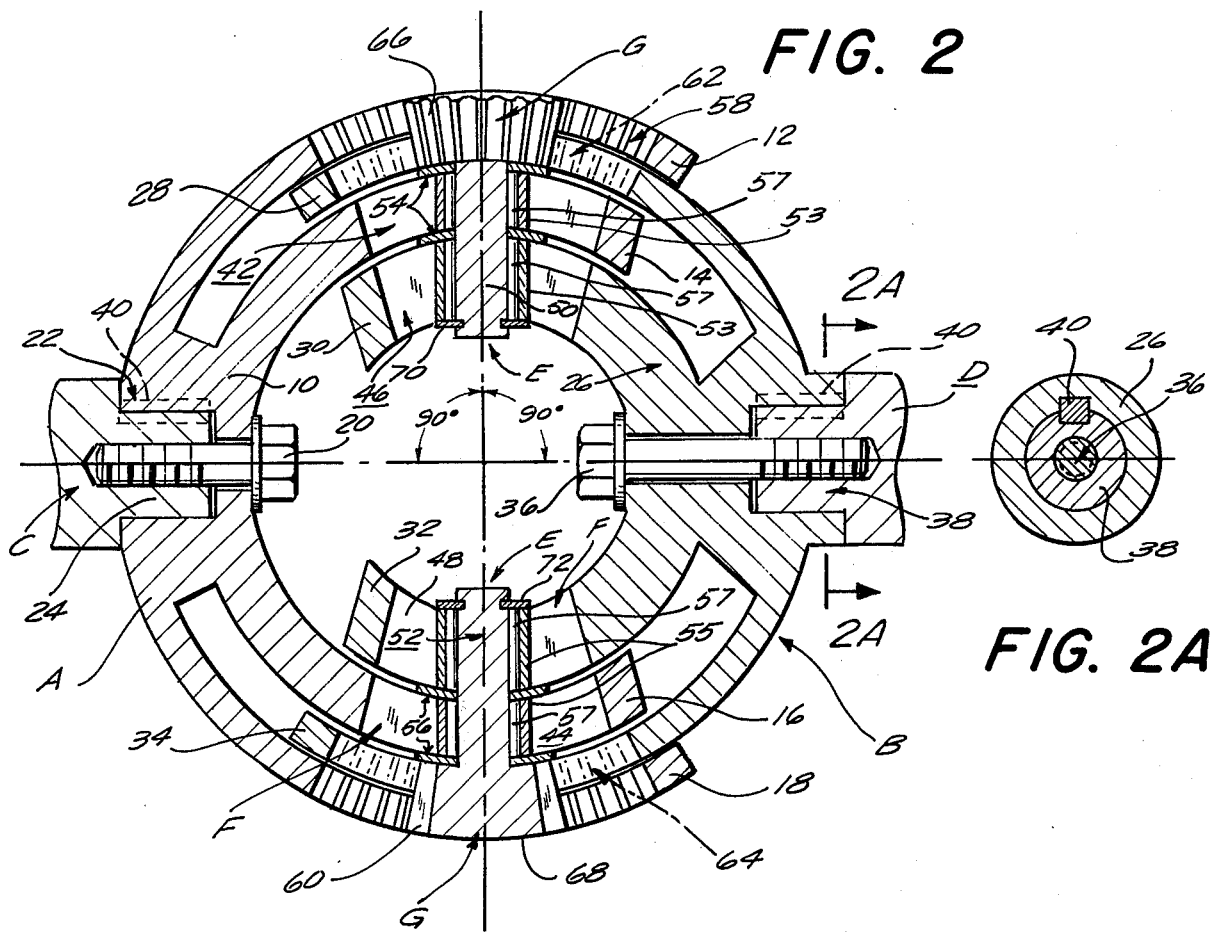

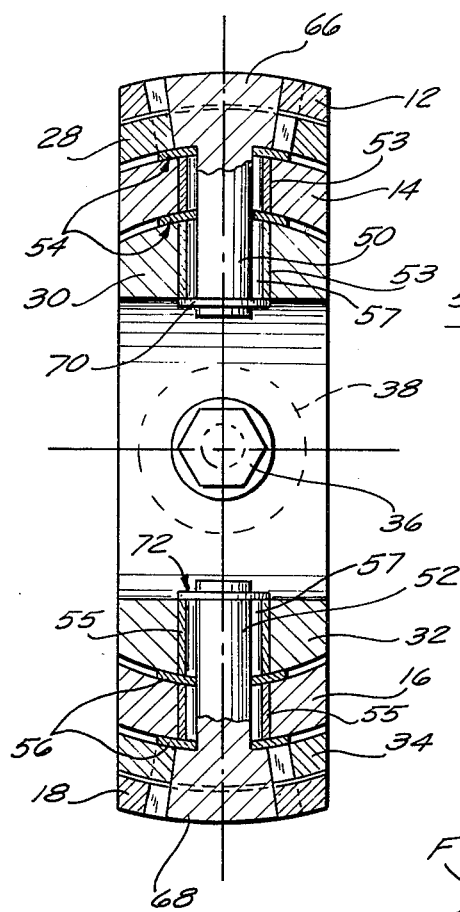
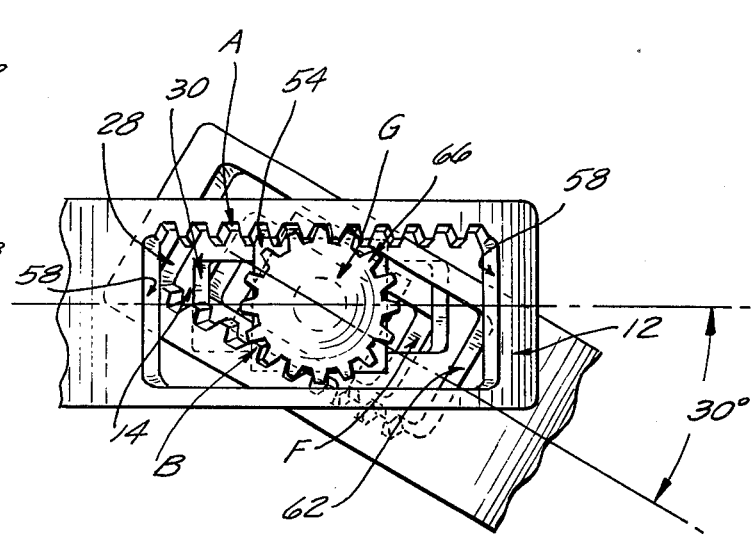
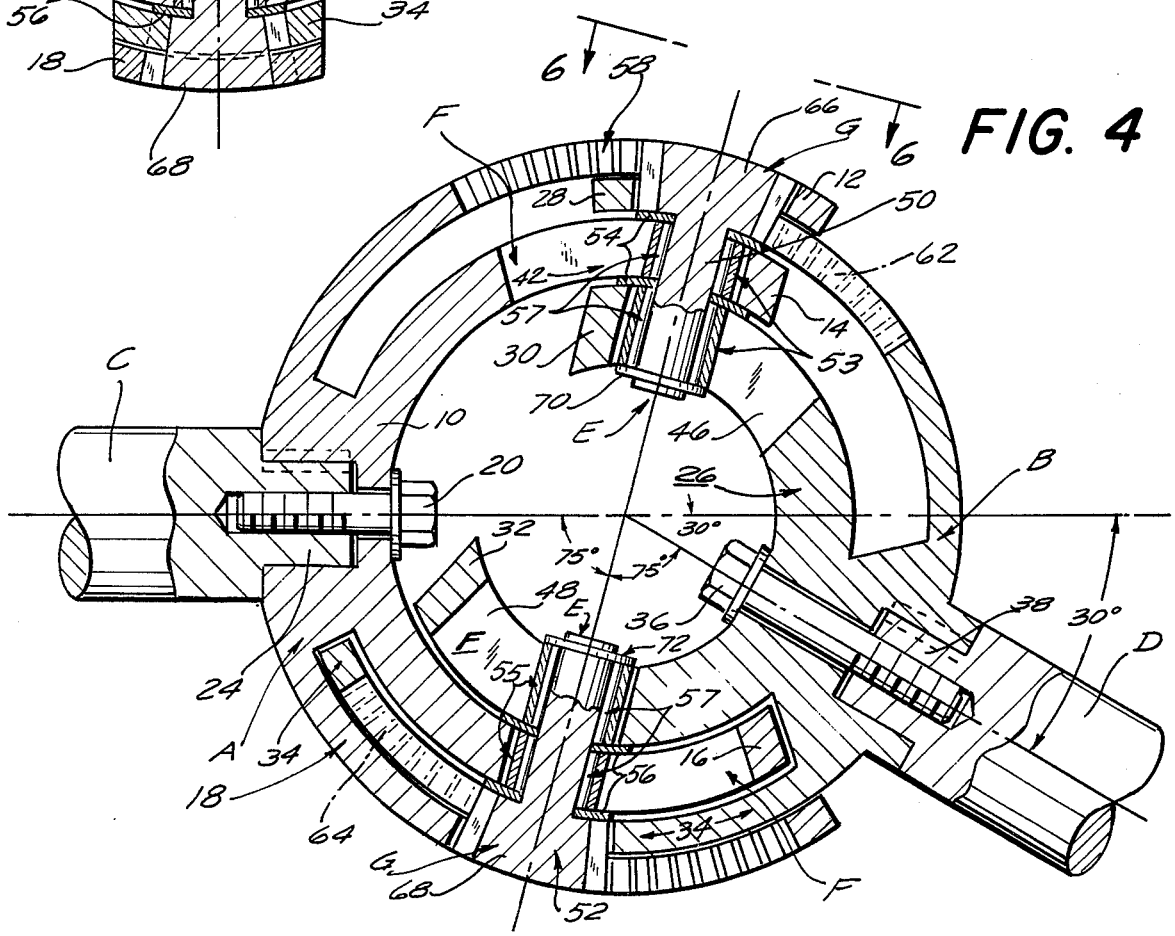

UNIVERSAL JOINT

The present invention relates to a universal joint and, more particularly, to a universal joint capable of transmitting torque from a drive shaft to a driven shaft at a uniform angular velocity regardless of the relative angular position of the shafts.

In various types of mechanical apparatus, it is necessary to transmit torque from one rotating shaft to another. If the axis of each of the rotating shafts remains in a collinear relationship, the coupling required need only transmit torque from one shaft to the other without permitting any relative rotational movement between the shafts.

However, there are instances when it is necessary to connect rotatable shafts wherein the axes of the shafts cannot be maintained in a collinear relationship because relative angular movement between the axes of the shafts is taking place. An example of such a situation is the connection between the drive shaft and the shaft connected to the rear wheels of an automobile. In this instance, the drive shaft is stationary but the rear wheels are movable, to a limited extent, to follow the contours of the roadway. Thus, the angular relationship between the axes of these shafts may be constantly changing. A particular type of coupling, referred to as a universal joint, is utilized to permit angular movement between the shafts in such situations. The universal joint transmits torque from the drive shaft to the driven shaft regardless of the relative angular movement between the axes of the shafts.

Conventional universal joints consist of a pair of opposing U-shaped yokes, one of which is fixedly mounted to each of the two shafts. The yokes are rotationally offset by 90° and connected by a cross-bar spider, the ends of which are cylindrical and fit into bearings in the end of each yoke. This structure permits angular movement between the axes of the two shafts while the transmission of torque is taking place from one shaft to the other.

This and other types of conventional universal joints, however, suffer a disadvantage in that if the angular velocity of the driving shaft is constant, the angular velocity of the driven shaft is non-uniform, when the axes of the two shafts are not collinear but intersect. Specifically, the driven shaft accelerates and decelerates as it is rotated due to the mechanical structure of the joint. The amount of the non-uniformity of the angular velocity of the driven shaft is a function of the angle between the axes of the shafts. Thus, as the angle between the axes of the shafts becomes greater, so does the non-uniformity of the angular velocity of the driven shaft.

An analysis of the movement of the parts of the conventional universal joint shows why the angular velocity transmitted from one shaft to the other is non-uniform. Each shaft is pivotally connected to the cross-bar spider at two spaced points. When the shafts are collinear, rotation of the shafts causes the cross-bar spider to rotate with its four legs in a single plane P perpendicular to the axes of the shafts. In this mode, the uniform angular velocity is transferred because the plane P of rotation of the spider bisects the straight angle made by the axes of the two shafts.

When the shafts are not collinear, i.e., the axis of one shaft is angularly offset from the axis of the other by an angle X, the spider can no longer rotate exclusively in the plane P.

Two legs of the cross-bar spider will rotate in plane P, perpendicular to the axis of one shaft, and the other two legs of the spider will rotate in plane R, perpendicular to the axis of the other shaft, where the dihedral angle between the intersecting planes P and R is equal to X.

A specific illustration of the acceleration and deceleration in the driven shaft has been computed and is shown in the following figures.

Assume the dihedral angle X to be 45°, and the four legs of the cross-bar spider to lie totally in plane P, perpendicular to the driving shaft, and two of these legs will also lie in plane R, perpendicular to the driven shaft. These two legs are common to both planes and, therefore, are on the line of intersection of the two planes. Also, assume plane P rotates at a uniform angular velocity of 15° per second.

Starting at one end of the diameter of intersection of the two planes, then in the first second plane R rotates 10°-44′; in the second second 11°-28′; in the third second 13°-04′; in the fourth second 15°-28′; in the fifth second 18°-32′; in the sixth second 20°-44′, a period of angular velocity acceleration. At this point, both driving and driven shaft have made ¼ revolution, and now the four legs of the cross-bar spider are totally in plane R and only two of these legs lie in plane P.

In the next quarter revolution, of six 15° intervals of plane P, plane R rotates successively through — 20°-44′; 18°-32′; 15°-28′; 13°-04′; 11°-28′; and 10°-44′, a period of angular velocity deceleration. Now the four legs are again totally in plane P, with only two legs in plane R. The following ½ revolution will be a repetition of the first ½ revolution.

From the above figures, it is evident that because of the structure of the conventional universal joint, transfer of uniform angular velocity from one shaft to another, when the shafts are not collinear, is impossible.

However, if the points of connection between the two shafts could be held, at all times, in a position where the points would be equidistant from the axes of both shafts, then these points would lie in the plane that is the perpendicular bisector of the angle between the two shafts; and the torque transfer would always be at a uniform angular velocity.

The fact that the conventional universal joint does not transmit uniform angular velocity is not a major problem in an apparatus such as an automobile, where the angular movement of the propeller shaft, up and down, is relatively small, and precision in the transfer of uniform angular velocity to the driving wheels is not required. In such an apparatus, small variations in the angular velocity of the driven shaft do not adversely affect the overall operation of the apparatus. On the other hand, there are certain precision instruments, for instance power lathes, which utilize universal joints where even small variations in the uniformity of the angular velocity of a driven shaft may adversely affect the total operation of the apparatus.

In order to overcome the acceleration and deceleration of the driven shaft, it is necessary that the structure of the joint be such that the points of connection between the two shafts be variable in position with respect to the axes of the two shafts, and, in particular, that these points of connection be equidistant from the axes of both shafts at all times. In order to achieve this, the points must lie in the plane bisecting the variable angle between the axes of the two shafts.

It is, therefore, a prime object in the present invention to provide a universal joint capable of transmitting angular velocity uniformly to the driven shaft regardless of the angle between the axis of the shafts.

It is another object of the present invention to provide a universal joint comprised of simple mechanical parts which may be inexpensively manufactured and assembled and which will perform reliably throughout the life of the joint.

In accordance with the present invention, the universal joint includes first and second parts operatively connected to the driving and driven shafts, respectively. The parts are relatively movable about a given point in accordance with the angular movement of the shafts relative to each other and are rotatable in accordance with the rotation of the shafts. Means are provided for operatively connecting the parts for simultaneous rotation thereof. Each of the parts has means for slidably mounting the connecting means therein to permit relative movement between the connecting means and each of the parts, respectively. Further, means are provided for maintaining the connecting means at a position equidistant from the axes of the shafts throughout the range of angular movement thereof. In this manner, torque is transmitted to the driven shaft at a uniform angular velocity, without acceleration and deceleration, due to the design of the joint, regardless of the frequency and magnitude of change in the angle between the two shafts.

The connecting means includes two pins which extend through radially aligned slots in each of the parts. The length of each of the slots is larger than the diameter of the pins such that a moving connection is achieved between the pins and each of the parts, respectively, thereby permitting movement between the parts. Each of the parts is also provided with gear racks which, when the parts are assembled, are spaced from each other. Idler gears, which are mounted to the head of the pins, mesh with both gear racks. As movement between the parts occurs, the gears, because of the meshing with the racks on each of the parts, are rotated so that the pins are moved relative to the parts in accordance with the relative movement between the parts. The degree of movement of the pins relative to the parts is a function of the extent of the movement between the parts. The pins stay at a position originally held between the gear racks before the racks began moving apart, each in an opposite direction. The relationship between the gears and the racks is such that the pins are always maintained in a plane which bisects the angle between the axes of the shafts as the parts are moved. Since the connection between the parts is always maintained in the plane bisecting the angle between the axes of the shafts, the angular velocity transmitted by the joint to the driven shaft is always uniform. No acceleration and deceleration of the driven shaft occurs due to the structure of the joint, regardless of the angular movement of the shafts.

To the accomplishment of the above and to such other objects as may hereinafter appear, the present invention relates to a universal joint as set forth in the appended claims and as described in the specification, taken together with the drawings, wherein like numerals refer to like parts and in which:

FIG. 2 is a side cross-sectional view of the universal joint of the present invention showing the shafts in a collinear relationship;

FIG. 2A is a cross-sectional view taken along line 2A—2A of FIG. 2;

FIG. 3 is a partial top view of the universal joint of the present invention, as seen from the top of FIG. 2;

FIG. 4 is a view similar to FIG. 2 but showing the universal joint of the present invention with the shafts angularly positioned with respect to each other (non-collinear);

FIG. 5 is a view of the universal joint of the present invention taken along line 5—5 of FIG. 3; and FIG. 6 is a view taken along lines 6—6 of FIG. 4.

Figure 1:
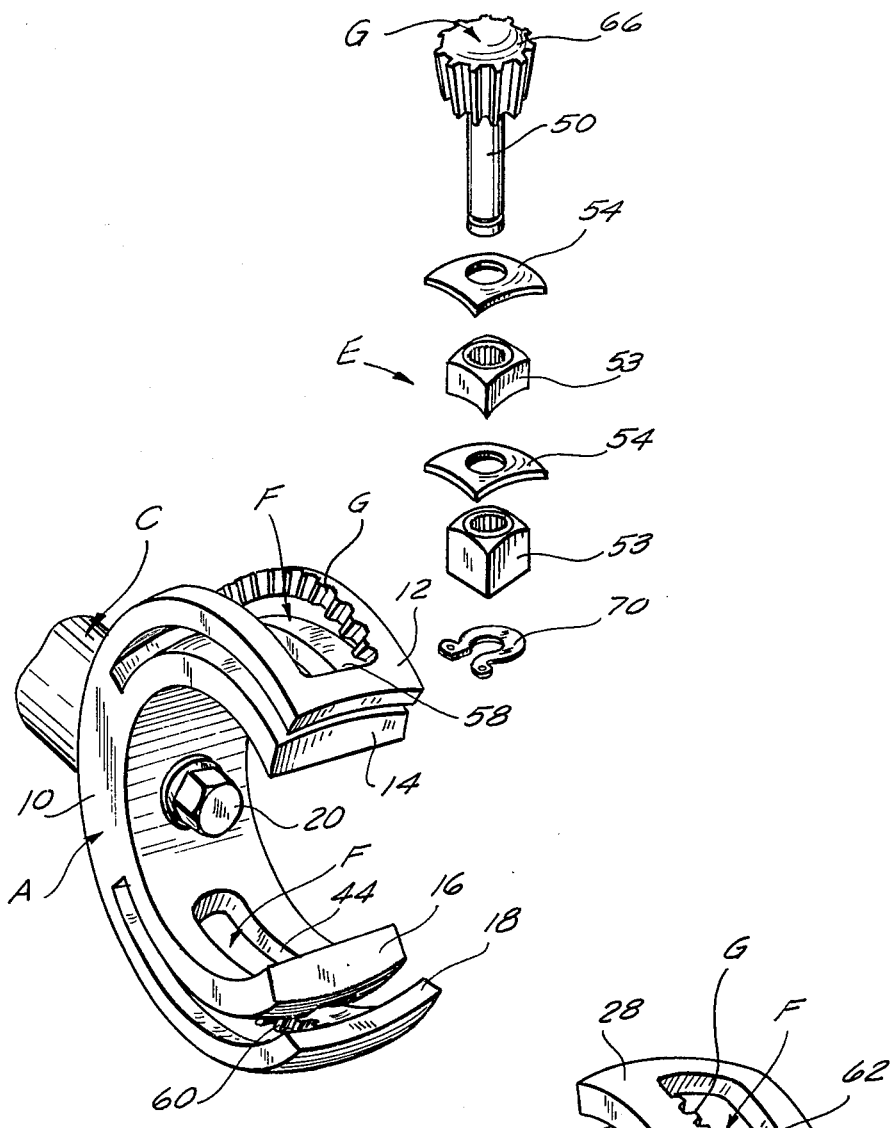
FIG. 1 is an exploded isometric view of the universal joint of the present invention.
Figure 1:
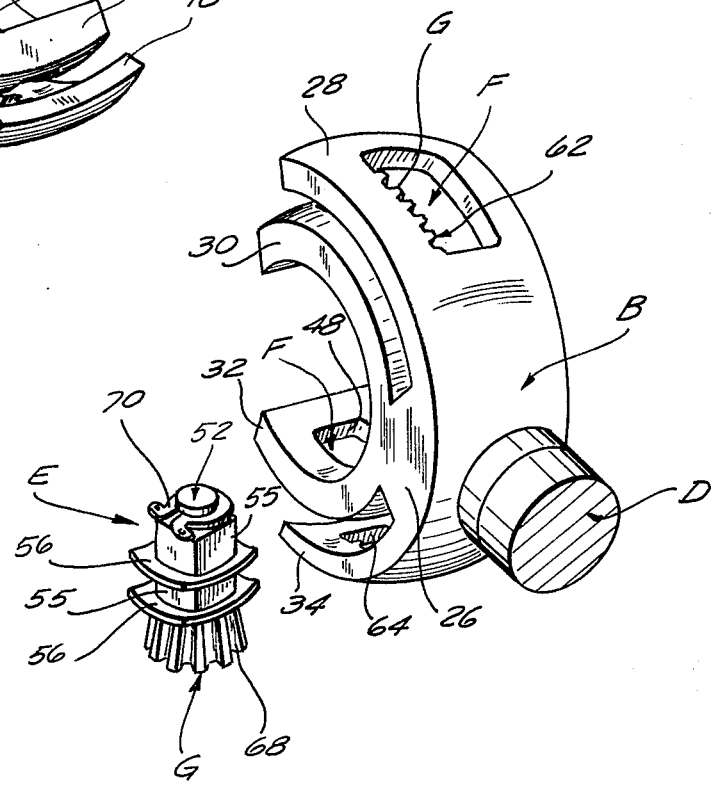

As shown in the drawings, the universal joint of the present invention comprises first and second parts, generally designated A and B, respectively, each of which is connected to a different shaft, generally designated C and D, respectively. Parts A and B are relatively rotatable about a given point, (the center of a theoretical enveloping sphere), in accordance with the angular movement of shafts C and D relative to each other and are rotatable in accordance with the rotation of the shafts. Means, generally designated E, in the form of a pair of pins, are utilized for operatively connecting parts A and B for simultaneous rotation thereof. Means, generally designated F, on each of the parts A and B, are provided for slidably mounting each of the connecting means E in the parts to permit relative movement between each connecting means E and each of the parts A and B, respectively. In addition, means, generally designated G, are provided for maintaining each connecting means E at a position equidistant from the axes of the shafts C and D throughout the range of angular movement thereof.

More specifically, part A comprises a body portion 10 from which two pairs of radially spaced arcuate fingers 12, 14 and 16, 18 extend. Fingers 12 and 14 extend from one side of body portion 10 and fingers 16, 18 from the opposite side. Body portion 10 is connected to shaft C by means of a bolt 20 which extends through body portion 10 and into threaded engagement with a portion 24 of shaft C, the shaft C, in turn, extending into an opening in the exterior surface of body portion 10. A key 22 is provided in portion 24 of shaft C. The opening in body portion 10 is provided with a keyway into which key 22 is inserted to prevent any relative movement between shaft C and part A.

In a similar manner, part B includes a body portion 26 having two oppositely extending pairs of radially spaced arcuate fingers 28, 30 and 32, 34 extending therefrom. A bolt 36 extends through body portion 26 and into meshing engagement with a portion 38 of shaft D which extends into an opening in the exterior surface of body 26. Part 38 is provided with a key 40 which fits into a keyway in the opening in body 26 to prevent any relative movement between shaft D and part B.

The fingers on each of the parts are sized and shaped so that when the parts are assembled, the fingers on one part mesh with the corresponding fingers on the other part in a manner which permits movement of the parts relative to each other about a given point.

The given point is the intersection of the axes of the two shafts, and also, the center of the sphere enclosing parts A and B. The top and bottom surfaces of each finger of parts A and B lie in a series of successively smaller concentric spheres. The width of the fingers, best seen in FIG. 5, is a circular spherical zone, seen as a circle in FIGS. 2 and 4.

This spherical zone, shown in FIGS. 3 and 5, appears as a flat plate, the thickness of the zone is equal to the width of the fingers, but when the two shafts intersect, and are not collinear, this flat plate would be broken along the center line of the driving pins.

When parts A and B are assembled, finger 14 of A fits between fingers 28 and 30 of B and finger 28 of B fits between fingers 12 and 14 of A. In a similar manner, finger 16 of A fits between fingers 32 and 34 of B and finger 34 of B fits between fingers 16 and 18 of A. Since each of the fingers has the same radius of curvature, the fingers on parts A and B mesh and the parts are movable with respect to each other about the given point which is the center of the top and bottom spherical surfaces of each of the fingers.

Each of the innermost fingers 14, 16 of A and 30, 32 of B are provided with a slot F. More specifically, finger 14 of A is provided with a slot 42, finger 16 of A is provided with a slot 44, finger 30 of B is provided with a slot 46 and finger 32 of B is provided with a slot 48. Slots 42 of A and 46 of B are radially aligned when the parts are assembled. In a similar manner, slots 44 of A and 48 of B are radially aligned when the parts are assembled. One of the connecting means E extends through each pair of radially aligned slots. Thus, a pin 50 extends through slots 42 and 46 and a pin 52 extends through slots 44 and 48.

Over the cylindrical pins 50, 52 are square section sleeves 53, 55, respectively, having cylindrical interior walls lined with needle roller bearings 57, so that the transfer of torque, or pressure, is from the area of the semi-cylindrical face of the pin, to the area of the semi-cylindrical portion of the roller bearing, then distributed to the outer flat face of the sleeve which bears against the flat surface of the slot in the finger. Spacer washers 54 are mounted on pin 50 and a portion thereof extends outwardly between fingers 14 and 30, and 14 and 28. Spacer washers 54 preferably have a square perimeter and are spherically curved to coincide with the curvature of top and bottom surfaces of fingers 14 and 30, and 14 and 28, and thereby maintain these fingers in a spaced relationship and to retain sleeves 53 in the proper position. In a similar manner, spacer washers 56 are provided on pin 52 and serve to maintain the spaced relationship between fingers 16 and 32, and 16 and 34 and to maintain sleeves 55 in the proper position.

Each of the outer fingers of parts A and B is also provided with a slot. Specifically, finger 12 of A is provided with slot 58, finger 18 of B is provided with a slot 60, finger 28 of B is provided with a slot 62 and finger 34 of B is provided with a slot 64. Each of the slots 58, 60, 62, 64 is provided, on one side thereof, with a rack of gear teeth. For instance, as shown in FIG. 1, slots 58 and 60 are provided with gear teeth on the right side thereof whereas slots 62 and 64 are provided with gear teeth on the left side thereof. Each of the pins 50 and 52 is provided with a beveled idler gear 66 and 68, respectively, which mesh simultaneously with the right and left gear racks on the inside of slots adjacent to the gears. Thus, gear 66 meshes with the gear racks in slots 58 and 62, and gear 68 meshes with the gear racks in slots 60 and 64.

The apex of the cone formed by the extended radial lines of the tapered teeth of the bevel gears 66 and 68, and the tapered teeth of the gear racks in which they rotate all meet at a single point, the center of the sphere enclosing parts A and B, and which is also the point of intersection of the axes of the two shafts. Pin 50 and idler gear 66 are held in position by a retaining snap ring 70 which fits into a recessed circular groove near the end of pin 50. In a similar manner, a retaining snap ring 72 fits into a recessed circular groove near the end of pin 52 to retain pin 52 and idler gear 68 in position.

FIG. 2 shows the universal joint of the present invention when the axes of shafts C and D are collinear. In this position, the pins 50 and 52 are situated at the mid-point of each of the slots 42, 58, 46, 62 and slots 44, 48, 60, 64, respectively. As angular movement occurs between the shafts, the fingers move relative to each other, such that the gear racks cause the idler gears 66 and 68 to rotate. This causes the pins to move relative to the parts to an extent which is a function of the relative angular movement of the shafts. The relationship between the idler gears and the respective teeth of the gear racks is such that as the gear racks on opposite sides of the bevel gears move laterally away from each other, in opposite directions, the rotation of the bevel gears hold the pins stationary relative to the opposing direction of movement of the gear racks, so that their position remains, always, equidistant from the axes of the two shafts. Thus, pin 50 will always bisect the angle formed between the axes of shafts C and D on the upper half of the joint (as shown in FIGS. 2 and 4) and pin 52 will always bisect the angle formed between the axes of shafts C and D on the lower half of the joint (as shown in FIGS. 2 and 4).

FIG. 4 shows the universal joint of the present invention wherein the axes of the shafts have been angularly moved with respect to each other to their extreme relative position. This position is the extreme position because each of the pins 50 and 52 is abutting the end of the respective slots through which they extend. It should be noted, however, that pins 50 and 52 have, because of the interaction between the gears and the racks, remained in a position which bisects the respective angles between the shafts. It should also be noted that the maximum permissible relative angular movement between the shafts may be increased, if desired, by increasing the size of parts A and B and thus the length of the slots which are formed in the respective fingers thereof.

The lubrication system for the universal joint has not been shown on the drawings for the sake of simplicity. However, lubrication will be required at each pin sleeve roller bearing, the spacer washers and the meshing gear teeth. This can be accomplished by a center axial oil hole in each pin from which oil holes will radiate outward to the pin sleeve roller bearings, the spacer washers, and to the spaces between the teeth of the bevel gear idlers.

Also, the joint will have to be enclosed for retention of the lubricant, and this can be done by means of a spherically shaped flexible neoprene rubber covering with accordian pleats, made in two symmetrical halves, each with a snug fitting collar at the shaft end, made leak-proof by applying a layer of sealant between the shaft and collar and then compressing the collar with a screw-hose clamp. The large diameter circular ends of the two halves are to have rigid extended flanges with bolt holes and a gasket placed between them before tightening the bolts.

Pins 50 and 52 connect parts A and B such that simultaneous rotation thereof is assured. In this manner, torque is transferred between shafts C and D. Idler gears 66 and 68 serve to maintain pins 50 and 52, respectively, in the plane of the bisector of the angle between the axes of shafts C and D. Thus, uniform angular velocity is transferred from one shaft to the other and the driven shaft exhibits no acceleration and deceleration caused by the structure of the joint during the rotation thereof.

It can also be seen that the joint of the present invention is composed of simple mechanical parts which can be inexpensively manufactured and assembled. The parts cooperate in a fashion which enables them to perform reliably throughout the life of the joint.

While only a single embodiment of the present invention has been disclosed herein for purposes of illustration, it is obvious that many variations and modifications can be made thereto. For example, there can be three or four equally spaced sets of fingers with three or four driving pins and bevel gears, similar to the two pins and gears here shown, and the joint would function equally as well. It is intended to cover all of these variations and modifications which fall within the scope of the present invention as set forth in the following claims.

I claim:

1. A joint for transmitting torque at the uniform angular velocity between a first and a second rotatable shaft angularly movable relative to each other, said joint comprising first and second parts operatively connected to said first and second shafts, respectively, said parts being relatively movable about a given point in accordance with the angular movement of said shafts relative to each other and rotatable in accordance with the rotation of said shafts, each of said parts comprising two pairs of articulate fingers situated in diametrically opposed relationship to each other, each pair of fingers on one part meshing with the corresponding pair of fingers on the other part as the parts are angularly moved, means for operably connecting said parts for simultaneous rotation thereof, means on each of said parts for slidably mounting said connecting means thereto to permit relative angular movement between said connecting means and each of said parts, respectively, and means for maintaining said connecting means at a position equidistant from the axis of said shafts throughout the range of angular movement thereof.

2. The joint of claim 1 further comprising second connecting means, one of said connecting means cooperating with each corresponding pair of fingers.

3. A joint for transmitting torque at a uniform angular velocity between first and second rotatable shafts which are angularly movable relative to each other, said joint comprising first and second parts, each of said parts comprising a body portion, each of said body portions being operatively connected to a different one of said shafts and a pair of arcuate fingers extending outwardly from said portion, said fingers being spaced from each other such that said finger pair on one part meshes with the finger pair on the other part as said parts are moved about a given point in accordance with the angular movement of said shafts relative to each other, one finger from each pair being provided with a slot therein, a pin extending through said slots, the other finger from each pair being provided with gear teeth, a gear mounted on said pin and meshing with the gear teeth on each of said other fingers, said pin causing said parts to rotate simultaneously as said shafts are rotated, said gear causing said pin to remain equidistant from the axes of the shafts as said shafts are angularly moved.

4. The joint of claim 3 wherein said given point is the point of intersection of the axes of said shafts.

5. The joint of claim 3 wherein said given point is the center of a series of successively smaller concentric spheres, each of said spheres being defined by the arcuate curve of the top and bottom surfaces of said fingers.

6. The joint of claim 3 wherein each of said parts has a second pair of arcuate fingers extending from said body in a direction opposite to said first pair, said fingers in said second pair being spaced from each other such that the second pair of fingers on one of said parts meshes with the second pair of fingers on the other of said parts, as said parts are moved about a given point in accordance with the angular movement of said shafts relative to one another, one finger from each of said second pair being provided with a slot therein, a second pair extending through said slots, the other finger from each of said second pair being provided with gear teeth, a second bevel gear mounted on said pin and meshing with each of said other fingers, said teeth on second finger causing said parts to rotate simultaneously as said shafts are rotated, said second bevel gear causing said second pin to remain equidistant from the axes of the shafts as said shafts are angularly moved.

7. The joint of claim 3 further comprising a sleeve through which said pin extends and a plurality of bearings situated within said sleeve between said pin and interior wall of said sleeve.

8. The joint of claim 7 wherein said sleeve has a square exterior configuration and a circular interior cross-section.

9. The joint of claim 3 further comprising a spacer washer mounted on said pin and extending at least partially between said one finger of each pair.

10. The joint of claim 9 wherein said washer has a square perimeter and is spherically curved to coincide with the spherical curvature of the top and bottom surfaces of said fingers.

* * * * *